(12) United States Patent
Radermacher (10) Patent No.: US 8,698,406 B2
(45) Date of Patent: Apr. 15, 2014

(54) ADAPTIVE CIRCUIT

(75) Inventor: Harald Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/695,803

(22) PCT Filed: May 5, 2011

(86) PCT No.: PCT/IB2011/051992
§ 371 (c)(1),
(2), (4) Date: Nov. 2, 2012

(87) PCT Pub. No.: WO2011/141856
PCT Pub. Date: Nov. 17, 2011

(65) Prior Publication Data
US 2013/0049618 A1   Feb. 28, 2013

(30) Foreign Application Priority Data
May 14, 2010  (CN) .......................... 2010 1 0176180

(51) Int. Cl.
*H05B 37/00* (2006.01)
*H05B 39/00* (2006.01)
*H05B 41/00* (2006.01)
*H05B 33/08* (2006.01)
*H02M 3/07* (2006.01)

(52) U.S. Cl.
CPC ............ *H05B 33/08* (2013.01); *H05B 33/0815* (2013.01); *H05B 33/0824* (2013.01); *H02M 3/07* (2013.01)
USPC ......... 315/188; 315/185 R; 315/187; 315/193

(58) Field of Classification Search
CPC .................................. H05B 33/08; H02M 3/07
See application file for complete search history.

(56) References Cited

U.S. PATENT DOCUMENTS

| 4,801,887 | A | 1/1989 | Wegener |
| 5,828,562 | A | 10/1998 | Rivet |
| 2008/0197786 | A1 | 8/2008 | Schaible et al. |
| 2010/0201285 | A1* | 8/2010 | Dellian et al. ................. 315/294 |
| 2013/0278157 | A1* | 10/2013 | Radermacher ................ 315/186 |

FOREIGN PATENT DOCUMENTS

| EP | 0720237 A1 | 7/1996 |
| JP | 57097361 A | 6/1982 |

\* cited by examiner

*Primary Examiner* — Anh Tran
(74) *Attorney, Agent, or Firm* — Mark L. Beloborodov (57) ABSTRACT

The invention describes an adaptive circuit (1, 1') for driving a lower-voltage DC load (2) from a rectified higher-voltage AC supply (3), which adaptive circuit (1, 1') comprises a charge-storage circuit (21, 21'), which charge storage circuit (21, 21') comprises a first capacitor (C1) and a second capacitor (C2) connected essentially in series, wherein the second capacitor (C2) is connected at least in parallel with the load (2); and an active switch (22, 22') realized as a controlled current source (22, 22') for controlling a load current ($I_{load}$) through the load (2) such that, in a closed switch state, load current ($I_{load}$) is drawn essentially from the first capacitor (C1) of the charge-storage circuit (21, 21'), and, during an open switch state, load current ($I_{load}$) is drawn essentially from the second capacitor (C2). The invention also describes an LED retrofit lamp (4) comprising a connecting means (40) for connecting the lamp (4) to a higher-voltage mains supply signal (U PS); an LED device (2) rated for a lower-voltage supply; and such an adaptive circuit (1, 1') for adapting the higher-voltage mains supply signal (U PS) to a low-voltage signal (U C2) for driving the lower-voltage LED device (2). The invention also describes a method of driving a lower-voltage DC load (2) from a rectified higher-voltage AC supply (3).

15 Claims, 7 Drawing Sheets

ADAPTIVE CIRCUIT

FIELD OF THE INVENTION

The invention describes an adaptive circuit for driving a lower-voltage DC load from a higher-voltage AC supply. The invention also describes an LED retrofit lamp and a method of driving a lower-voltage DC load from a higher-voltage AC supply.

BACKGROUND OF THE INVENTION

Advances in LED (light-emitting diode) technology have led to the development of LEDs with a satisfactorily high light output, making them an interesting alternative to incandescent or fluorescent lamps. An LED lighting device can easily be designed to exceed an efficacy of 100 $\mu$m/W. Furthermore, LEDs are more efficient and more reliable than conventional lamps, and have a longer lifetime. Therefore, using LEDs to replace conventional lamps contributes to a reduction in energy consumption and reduced emissions from power plants. Packages or chips containing series-connected LED junctions (to form an LED string with a high forward voltage) are suitable for low-cost general lighting applications, and LED devices directly running off an AC mains supply—called ACLEDs or mains-compatible LEDs (MCLEDs)—are currently available. However, there are some drawbacks related to direct mains driving. Firstly, the current waveform given to the ACLED has a high peak value compared to the average value. Hence, the ACLEDs are driven with a reduced efficiency due to 'droop'. Secondly, current flow through the ACLED package is only possible when the instantaneous mains voltage is higher than the forward voltage of the package's LED string. Therefore, during relatively 'long' periods, no light is emitted. This is perceived as an annoying 'flicker', so that such lamps are unacceptable for applications such as indoor lighting.

The flicker problem can be solved by using a rectifier and a capacitor, however, a high voltage LED string will still be required, since the working voltage of the LED must match the resulting rectified mains voltage. Usually, an LED chip comprises one or more LED junctions connected in series such that the sum of the forward voltages matches the supply voltage. Evidently, the more junctions of a given size are connected in series to act as an LED load, the higher will be the power consumption of the LED load. As the skilled person knows, to obtain an LED load with a high forward voltage and low power consumption, a small junction size would be required. However, very small junctions are expensive to manufacture, and, because of the smaller active area, the overall efficiency obtainable by such a device is unsatisfactory. Therefore, a low power LED package for operating off a 230 V mains supply cannot be realised and operated economically. To operate a more economical, commercially available device, for example a device rated for a 110 V mains, additional circuitry such as a transformer or a capacitive power supply must be used to convert the high input voltage to the necessary low output voltage. Such circuits are lossy, expensive, bulky and heavy and are associated with an unacceptably low power factor of less than 0.5.

However, 0.5 is the minimum power factor specified by some energy labels for LED lamps. But even without this requirement, it is desirable to achieve a high power factor while minimizing losses and the cost required to achieve such a high power factor. One reason for desiring a higher power factor is that, at a fixed real power consumption and a low power factor, the input current of a load (and therefore also the current stress for some components) is typically high. To achieve at least the desired minimum power factor, the known circuits require very precise matching of the components. However, this is made very difficult owing to the unavoidable component tolerances and the variations in voltages (voltage bins) even for identical LED packages. In an alternative approach, JP 5709736 describes the use of a capacitive split circuit with two or more switches for obtaining a step-down voltage. However, in the circuit described, at least one of the switches will be subject to extreme voltage stress during mains voltage transients, so that the switch may ultimately fail unless it is provided with additional overvoltage protection. Also, at least two switches are necessary, and these must be precisely synchronized to the input signal.

Therefore, it is an object of the invention to provide an improved adaptive circuit that avoids the problems mentioned above.

SUMMARY OF THE INVENTION

The object of the invention is achieved by the adaptive circuit of claim 1, by the low-power LED retrofit lamp according to claim 8, and by the method according to claim 10 of driving a lower-voltage DC load from a rectified higher-voltage AC supply.

According to the invention, the adaptive circuit for driving a lower-voltage DC load from a rectified higher-voltage AC supply comprises a charge-storage circuit, which charge-storage circuit comprises a first capacitor and a second capacitor connected essentially in series, wherein the second capacitor is connected essentially in parallel with the load, and an active switch realised as a controlled current source for controlling a load current such that, in a closed switch state, load current is drawn at least from the first capacitor of the charge-storage circuit, and, during an open switch state, load current is drawn essentially from the second capacitor.

Herein, the term 'higher-voltage' is to be understood to refer to any AC voltage having an essentially sinusoidal shape, for example the mains voltage available in any household, e.g. 230 V in Europe, 110 V in the USA, etc. In the following, for the sake of simplicity but without restricting the invention in any way, the AC supply may be simply referred to as the 'mains supply' or the 'mains'. The term 'lower-voltage' is to be understood to be a rated voltage for a device that is considerably lower than the (relatively) higher-voltage AC supply. For example, for a 'higher-voltage' 230 V mains supply voltage, a 'lower-voltage' device can be a device that is in fact designed to be run off a 110 V mains supply. For a 'higher-voltage' 110 V mains supply, on the other hand, the 'lower-voltage' load might be a 60 V device.

An obvious advantage of the adaptive circuit according to the invention is that it allows efficient operation of a lower-voltage LED device (also referred to in the following as a 'low-power device') from a higher-voltage AC supply (for example, a 100 V device operated from a 230 V mains), while being a very robust circuit compared to prior art circuits that address this problem. Here, the term 'lower-voltage load' is to be understood to mean a DC supply voltage requiring load with a substantially lower rated voltage, typically in the order of only half the AC supply voltage.

Since the active switch is realised as a controlled current source, the equalising currents that occur between the first and second capacitor can be favourably limited compared to a conventional 'hard' switch. In this way, the switch is not subject to potentially damaging stress due to voltage and current surges when switching. Also, because only relatively low currents flow through the switch, it can be realised with a relatively smaller-sized area and at correspondingly lower cost. Furthermore, owing to the controlled manner in which current is supplied to the load, a relatively low value for the second capacitor is sufficient to obtain a low ripple on the load voltage waveform.

In contrast to existing capacitive power supply circuits, which are typically associated with low power factors, the adaptation circuit according to the invention can achieve a very favourable power factor of at least 0.6.

The LED retrofit lamp according to the invention comprises a connecting means for connecting the lamp to a higher-voltage mains supply signal, an LED device rated for a lower-voltage supply, and such an adaptive circuit for adapting a voltage of the higher-voltage mains supply signal to drive the lower-voltage LED device.

Such a retrofit lamp can be favourably used to replace existing incandescent lamps that are being phased out for environmental reasons, and can be driven off a high mains voltage such as the European 230 V mains supply. By including an adaptive circuit according to the invention, low-wattage incandescent lamps, for example 5W-25 W lamps, can be more economically replaced by low wattage, low forward voltage LED packages (e.g. packages rated for 110 V mains voltage) instead of having to use LED packages with a higher forward voltage (and typically also higher power consumption) rated for 230V mains voltage.

According to the invention, the method of driving a lower-voltage DC load from a rectified higher-voltage AC supply comprises the steps of storing charge in a charge-storage circuit, which charge-storage circuit comprises a first capacitor and a second capacitor connected essentially in series, wherein the second capacitor is connected essentially in parallel with the load; and actuating an active switch, which active switch is realised as a controlled current source to control a load current through the load such that, in a closed switch state, load current is drawn at least from the first capacitor of the charge-storage circuit, and, during an open switch state, load current is drawn essentially from the second capacitor.

The dependent claims and the following description disclose particularly advantageous embodiments and features of the invention. Features of the embodiments may be combined as appropriate.

The adaptive circuit according to the invention can be used with any appropriate power supply. However, since many applications for such a power supply adaptation may be found in the home or domestic environment, any reference to a rectified AC supply in the following can be understood to be a full-wave rectified AC mains supply signal, but without this restricting the invention in any way.

The active switch can be realised using any suitable type of switch circuitry, and can be switched according to any desired predefined condition. In a particularly preferred embodiment of the invention, the adaptive circuit comprises only a single active switch. This single switch is sufficient to implement the switchover between the charging and discharging states of the charge-storage circuit and to provide the load with a satisfactorily stable output voltage. When the active switch is 'open', only a minimal current (e.g. a leakage current or an auxiliary supply current required to drive a control input of the switch) flows through the switch in this state. When the active switch is 'closed', a current up to a predefined maximum value can flow through the switch.

The charge storage circuit is preferably realised as a 'capacitive split', i.e. the charge storage circuit preferably comprises two series-connected capacitors, and the load is connected across one of these capacitors. The input voltage to the adaptive circuit (and therefore also the charge-storage circuit) is applied between a first input voltage node and a second input voltage node, in the following also referred to as the 'ground node'. The load is connected in parallel with the second capacitor between an intermediate node and the ground node. Since this type of circuit effectively 'splits' or divides the input voltage and presents only a fraction of the input voltage across the load, it acts as a divider or 'splitter'.

In the actively-controlled adaptive circuit according to the invention, the load is preferably essentially continuously driven from the second capacitor, while the active switch is periodically actuated to augment the load current with current supplied by the first capacitor as it discharges. The part of the adaptive circuit comprising the second capacitor connected in parallel with the load can therefore be regarded as a type of 'buffer' for stabilising the load voltage, while the part of the adaptive circuit comprising the first capacitor and the active switch can be regarded as an additional source of current that can be used to charge the second capacitor.

The active switch, connected essentially across the first capacitor, is preferably realised to decouple the load from the first capacitor (and therefore also from the input supply) during a charge-storage circuit charging state, i.e. while the first and second capacitors are charging (when the momentary voltage across the input to the adaptive circuit is high enough to charge the series connection of the two capacitors) and to supply the load with current from the second capacitor during a discharging state of the charge-storage circuit (when the voltage across the input to the adaptive circuit has decreased). In this way, the active switch can control or limit the current flowing through the load, and can ensure a sufficient supply of current to the load regardless of the charging status of the capacitive-split circuit.

An active switch can be realised using any suitable electronic components. In a preferred embodiment of the invention, the active switch comprises a transistor such as a bipolar junction transistor (BJT), a field-effect transistor such as a MOSFET, a Darlington pair, etc., in conjunction with a voltage source connected between the intermediate node and a control input (e.g. base or gate) of the transistor. Preferably, a resistor is included in the path shared by the transistor load current and the load drive signal. Effectively, the control input voltage minus the voltage drop across the transistor (the base-emitter voltage or the gate-source voltage) determines the maximum possible voltage drop across this resistor and therefore also the maximum possible current through the active switch. The voltage source can be any suitable component or circuit that is capable of presenting an essentially constant voltage regardless of the current flowing through it. Various possibilities will be known to the skilled person. For example, the voltage source could comprise a Zener diode. In such realisations, where the closing of the switch depends on a voltage (the base or gate voltage), the active switch behaves as a dependent or controlled current source.

The active switch is opened or closed according to the voltage at the base or gate of the transistor. By controlling this voltage, the instant at which the transistor opens or closes can also be controlled. Therefore, in a particularly preferred embodiment of the invention, the active switch also comprises a switch controller realised to close the active switch in a specific input voltage range. In such a realisation, for example, the switch controller can comprise a transistor whose base or gate voltage is controlled by a Zener diode with a suitable knee voltage connected between the gate and an output of a voltage divider connected across the input voltage nodes. Whenever the input voltage rises above a certain voltage level, the Zener diode breaks down, the switch controller transistor starts conducting, and hence lowers the voltage at the control input of the active switch, and the active switch is opened, i.e. allowing hardly any current to flow from the first capacitor to the parallel connection of the LED and the second capacitor.

In a further preferred embodiment of the invention, the switch controller could be realised to close the active switch at a specific time. In such a realisation, the switch controller could comprise a micro-controller programmed to supply a suitable switch actuating signal according to a predefined switching scheme. A lamp comprising such a switch controller could then be exactly 'tuned' so that its active switch is opened or closed only at certain predefined instants relative to the input voltage shape. Typically, the switching scheme in such a timed embodiment will be synchronised to the AC input voltage. Combined voltage- and time-controlled switching is also possible. As an example, the active switch could be closed some time after the mains voltage has dropped below a certain first threshold value and be opened as soon as the mains voltage rises above a (possibly different) second threshold value. The controlling circuitry for the active switch is preferably adapted to the voltage and the frequency of the AC input signal, i.e. different threshold values and different timings may be used for systems with different characteristics e.g. a mains frequency of 50 Hz or 60 Hz; a mains supply voltage of 100 V or 230 V, etc.

As indicated above, the adaptive circuit uses a higher-voltage rectified AC signal to produce a lower-voltage output for driving a load. The adaptive circuit can therefore be used in conjunction with any suitable rectification circuitry, and can be realised with the appropriate connection means, and can be driven from any suitable AC signal. Therefore, in a particularly preferred embodiment of the invention, the adaptive circuit includes such a rectification means, which could, for example, comprise a diode bridge rectifier for performing a full-wave rectification on the AC signal, for example from an AC mains supply. To improve the behavior of the circuit in response to transients, the adaptive circuit can also comprise an inrush resistor for damping a voltage or current surge.

The components of the adaptive circuit are preferably chosen so that the adaptive circuit is particularly suited for adapting an input voltage from a 230 V mains supply to an output voltage with a range of 80V to 140V.

When realised for mains supply operation, such as European mains supply, the low-power LED device of the LED retrofit lamp according to the invention preferably comprises a 2 W LED device and the adaptive circuit is realised to drive the LED device from a 230 V mains supply by a suitable choice of components as indicated above. Of course, any other suitable LED package could be used in the inventive LED retrofit lamp, and the embodiment mentioned here is to be understood to be exemplary.

The active switch can be opened or closed at any time. However, since the charging and discharging behavior of the capacitors is directly related to the mains voltage shape, the shapes of the voltages at the first input voltage node and the intermediate node are also linked to the mains voltage shape. The load can therefore be optimally driven by closing or opening the switch at appropriate instants in time. Therefore, in a preferred embodiment of the method according to the invention, the active switch is actuated synchronously to the voltage of the AC mains supply, i.e. the switch is opened or closed at instants that correspond to certain 'points' along the input voltage shape.

The actual instant at which the active switch is opened or closed can influence the circuit in a number of ways. As long as the switch is open, input current can only be drawn from the mains while the capacitors are charging. In the method according to the invention, by closing the switch at a certain stage, i.e. by influencing the behavior of the charge-storage circuit, an additional 'path' can be offered for input current flow. Therefore, in a further preferred embodiment of the method according to the invention, the instant of actuation of the active switch is chosen according to a desired apparent reactance of the adaptive circuit, i.e. the reactance 'seen' from the input terminals. By switching the active switch closed during a certain 'section' of the input voltage shape, the load can be seen—from the point of view of the mains supply—to behave as a capacitive load or an inductive load. In this way, the lamp can be 'tuned' to act as a capacitive or inductive load. For a lighting application with many such retrofit LED lamps, a certain proportion can be realised to act as inductive loads, and another proportion can be realised to act as capacitive loads. In this way, the overall reactance of the loads is neither excessively capacitive nor excessively inductive. Another advantage of controlling the current flow relative to the charging peak of the charge-storage circuit is that the harmonics of the input current waveform can be influenced. Generally, it is desirable to reduce the number of higher-order harmonics in the current drawn from the mains, since higher-order harmonics detract from the overall power factor of the circuit. By using a favourably chosen switching scheme, the input current can be adjusted so as to have a marked fundamental and only minor higher-order harmonics. The adaptive circuit can also be realised to comply with further regulation requirements for lighting applications. For some countries, not only power factor and harmonics are regulated, but the starting point, the peak point and the ending point of input current flow from the mains into the load are also specified. When these parameters are specified, there are usually less stringent requirements placed on the higher-order harmonics. The adaptive circuit can be realised to provide the required input current wave shapes in order to fulfil such requirements, for example by making more use of the continuous controllability over time of the active switch. In most of the examples described so far, the discharging of the first capacitor via the active switch was performed while the input voltage is lower than the voltage stored in the capacitor. In these cases, the discharge current is not noticeable on the input supply terminals of the adaptive circuit. When activating (i.e. closing the switch) takes place during a time period where the instantaneous value of the input voltage is lower than the voltage stored in the capacitor, part of the switch current is directly drawn from the input terminals.

Hence, during these periods, an actively controlled input current can be programmed.

In a simple example, a predefined current waveform with optimized efficiency and harmonic content can be previously determined and stored in a memory of the adaptive circuit. Then, after synchronization to the input frequency, the active switch current is controlled according to the predetermined waveform to generate the desired input current. To this end, the adaptive circuit can comprise a non-volatile memory and a waveform playback unit. Preferably, the adaptive circuit comprises a microcontroller capable of running an appropriate programme or algorithm.

In a preferred embodiment of the invention, the total amount of power delivered to the load is determined by the control signal given to the active switch. By appropriate timing of the switch relative to the signals on the input side, the current delivered to the load, and therefore also the power, can be controlled as desired.

Since it is desirable to allow the capacitors to fully charge up before allowing them to discharge again, in a further preferred embodiment of the invention, the active switch is switched from open to closed to initiate a discharging state of the charge-storage circuit. In other words, the switch is only closed after the input voltage has peaked, since, after this time, the charge across the capacitors has reached its maximum and will not increase any further.

When the active switch is realised using a transistor, the switch will be closed, i.e. conducting, whenever the base or gate voltage exceeds a certain level, and the switch is effectively controlled with a discrete drive signal that can be generated using an appropriate Zener diode. The active switch could however be realised using an alternative to the discrete Zener voltage source described above. Therefore, in another preferred embodiment of the invention, the active switch is actuated by a continuous drive signal. For example, with suitable circuitry between a transistor for measuring the supply voltage and the active switch control input, the active switch current can be decreased and increased slowly, such that the active switch receives a continuous drive signal for at least part of the time. In a further embodiment, the microcontroller can generate such a continuous drive signal (e.g. using a timer based pulse-width-modulation generator and a low pass filter, or using a digital-to-analogue converter) and can be realised to not only control the active switch to be open or closed, but also to actively control the permitted amount of current at any point in time.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
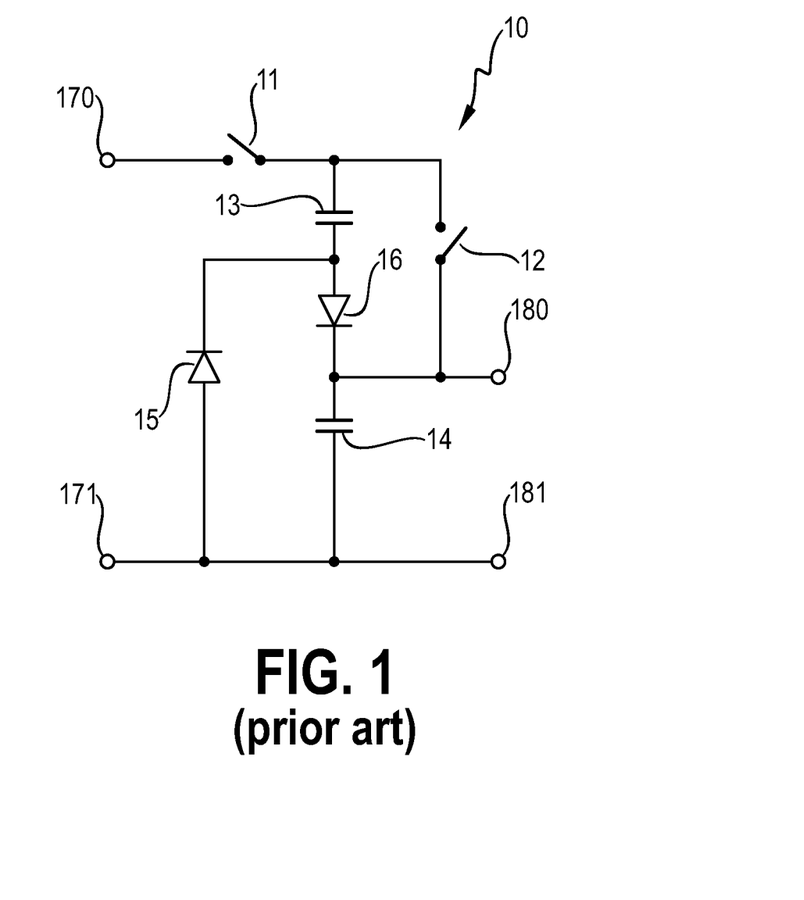
FIG. 1 shows a prior art adaptive circuit.

FIG. 1 shows a prior art adaptive circuit 10 of the type described in

JP 5709736 for stepping down an input voltage applied across input terminals 170, 171 in order to obtain a lower voltage for a load connected across output terminals 180, 181. This type of circuit is suited for small device applications such as hand-held devices, where a transformer would be unsuitable owing to its size and weight. The input voltage can be a DC voltage or a rectified AC voltage. A first switch 11, a first capacitor 13, a diode 16 and a second capacitor 14 are connected in series. A second diode 15 is connected in parallel with the first diode 16 and the second capacitor 14. A second switch 12 is connected across the first capacitor 13 and first diode 16. To step down the input voltage, the first and second switches 11, 12 are switched alternately. When the first switch 11 is closed (and the second switch 12 is open), the series-connected capacitors 13, 14 are charged and the load is driven by the voltage accumulating between the first diode 16 and the second capacitor 14. Then, the second switch 12 is closed and the first switch 11 is opened. During this time, the capacitors 13, 14 discharge so that the load is driven by both capacitors 13, 14. In this prior art circuit, the values of the capacitors 13, 14 should be equal to obtain an output voltage that is half the input voltage. By extending the step-down circuit to comprise N capacitors in series, 1/N voltage division can be obtained.

However, this type of circuit 10 has a number of disadvantages. For example, if this circuit is driven off the mains, both switches must be exactly synchronised in a specific temporal relationship to the mains voltage signal. A minimum of two switches is required in order to be able to use a full-wave mains input. Also, since the current flow between the two capacitors at the instant of closing the switch 12 can reach a large value, the components must be rated for a high peak stress, necessarily causing them to be larger and more expensive compared to components that are not required to withstand such peak currents. Furthermore, while the switch 11 is opened, any voltage transients present on the input terminals 170, 171 (e.g. originating from voltage surges on the mains to which the input terminals are connected) are not limited or clamped and will result in a voltage stress across switch 11. In a closed state of switch 11, surges will lead to a high current through switch 11. In brief, switch 11 is exposed to high stress when operated from a real mains voltage distorted by surges. Furthermore, only fixed 1/N voltage division ratios are possible, so that the applications are limited.

Figure 2:
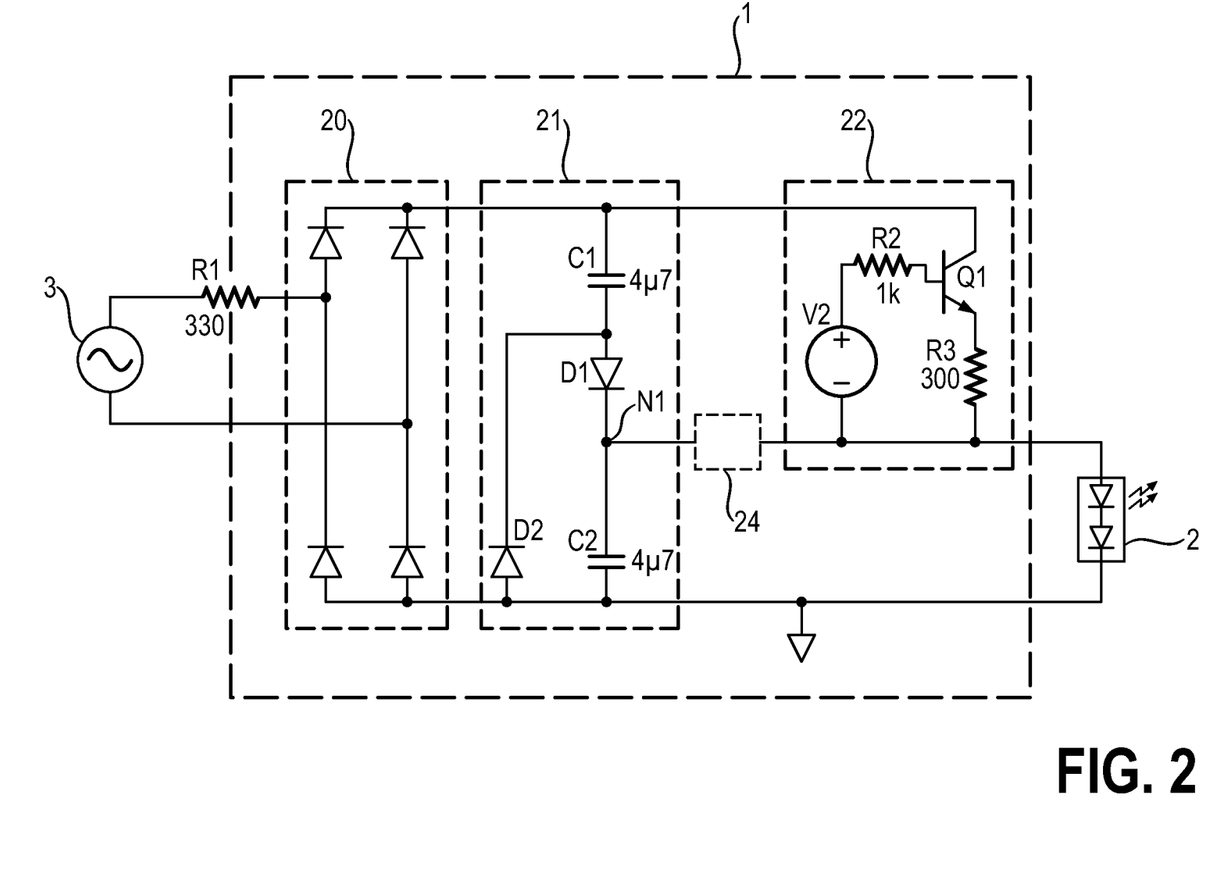
FIG. 2 shows a circuit diagram of an adaptive circuit according to a first embodiment of the invention.

FIG. 2 shows an adaptive circuit 1 according to a first embodiment of the invention, used to drive a lower-voltage load 2 from a higher-voltage input. In this example, the higher-voltage input is derived by performing full-wave rectification on a 230 V AC mains supply 3, using a diode bridge rectifier 20. A resistor R1 may precede the rectifier 20. The load to be driven by the adaptive circuit 1 comprises a 2 W 110 V LED package 2. The adaptive circuit 1 comprises a charge-storage circuit 21 composed of a first capacitor C1 and a second capacitor C2 connected in series, with two diodes D1, D2, in an arrangement 21 which can be referred to as a 'modified valley-fill circuit'. The adaptive circuit 1 also comprises an active switch 22 acting as a controlled current source 22, which is constructed using a voltage source V2, a transistor Q1, and current-limiting resistors R2, R3. Example values for the circuit components are given in the diagram.

An additional optional resistive circuit element 24 can be inserted in the path between the active switch 22 and the second capacitor C2 in order to limit the current flowing through this path at any one time. The effective value of such a resistive circuit element 24 may be dependent on the direction in which current flows through it. To this end, this resistive circuit element 24 can be realised by a suitable arrangement of resistors and/or diodes.

Figure 3:
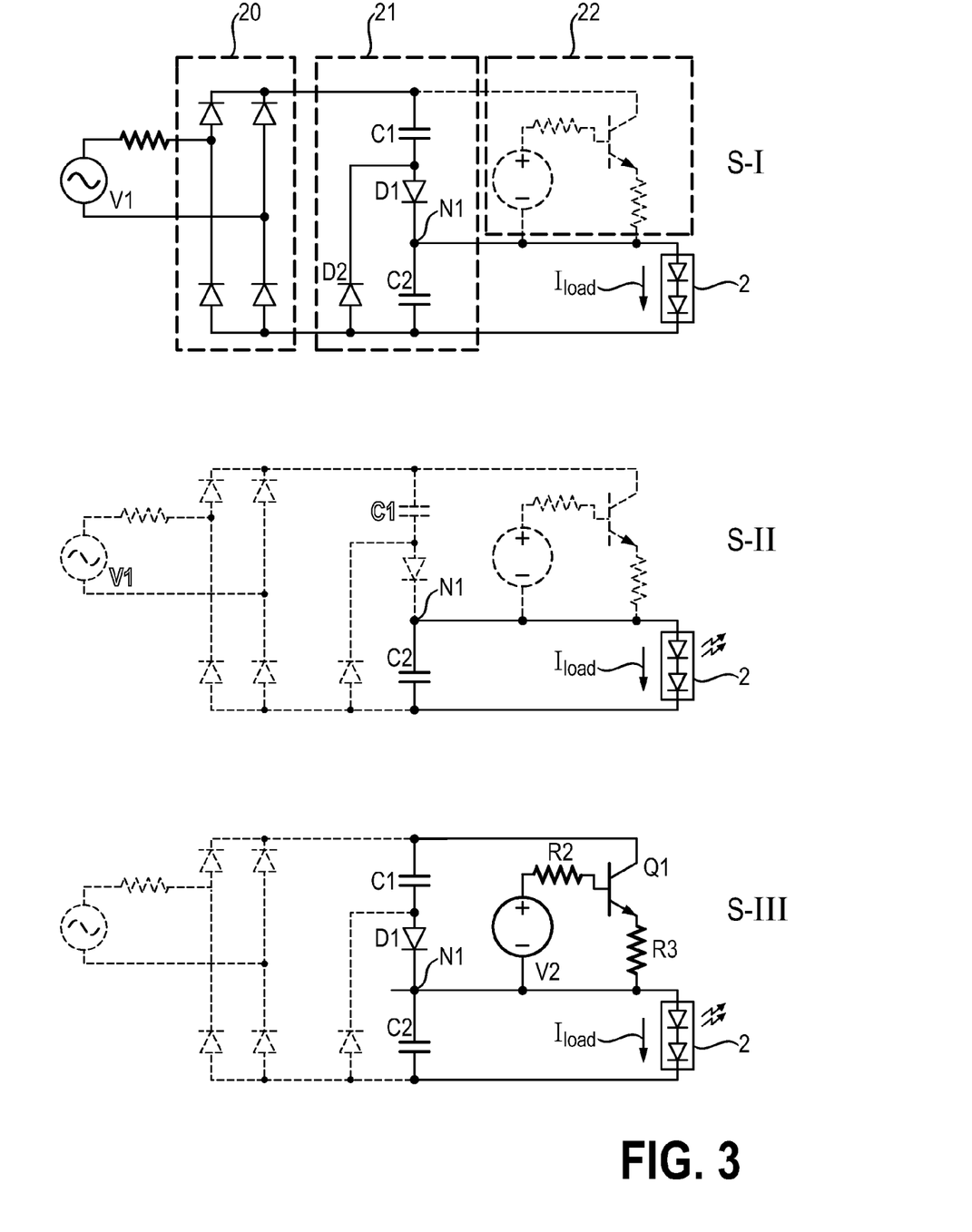
FIG. 3 illustrates the principle of operation of the circuit of FIG. 2.

FIG. 3 illustrates the three-state principle of operation of this circuit 1. The diode bridge 20 supplies a full-wave rectified signal essentially comprising a series of positive sine-wave halves. In the upper part of the diagram, in a 'charging state' S-I, the switch 22 is opened while the capacitors C1, C2 charge from the rising input voltage signal. Since the switch 22 is open, this part of the circuit can be ignored, as indicated by the dotted lines. During this time, the load 2 is fed only by the second capacitor C2 while it is charging. For the sake of clarity, in FIG. 3, only the relevant components in each state are denoted by their reference signs.

Once the capacitors C1, C2 have charged, no current is drawn from the mains 3. Therefore, in the subsequent 'transition state' S-II, the supply side of the circuit can be ignored, as indicated by the dotted lines in the second part of the diagram. The switch is still open, so that this can also be ignored, as indicated by the dotted lines. The load 2 is again driven only from the second capacitor C2.

As the input voltage drops even further, both capacitors C1, C2 can discharge again, as shown in a third state S-III in the lower part of the diagram. The switch 22 is closed, so that current flows through the transistor Q1. In this 'discharging state' or 'balance state' S-III, the load 2 is supplied with current mainly by the discharging first capacitor C1. In this state, the load 2 may also draw current from the second capacitor C2, as indicated in the diagram. Equally, the second capacitor C2 may be charged again by a current diverted from the active switch 22. The actual current distribution through these circuit elements will depend largely on the voltages at the various nodes at any one instant. Since the input voltage is dropping, no current is drawn by the capacitors C1, C2 from the supply side of the circuit, so that this can be ignored, as indicated by the dotted lines.

The voltage applied to the load 2 during these three states, S-I, S-II, S-III, cannot exceed the voltage at node N1, which is effectively limited to a maximum of half the input peak voltage, thus ensuring that the lower-voltage load 2 can be driven safely. The highest voltage that can be accumulated across the second capacitor C2 is governed by the choice of components for the first and second capacitors, and whether these are matched or not.

Figure 4:
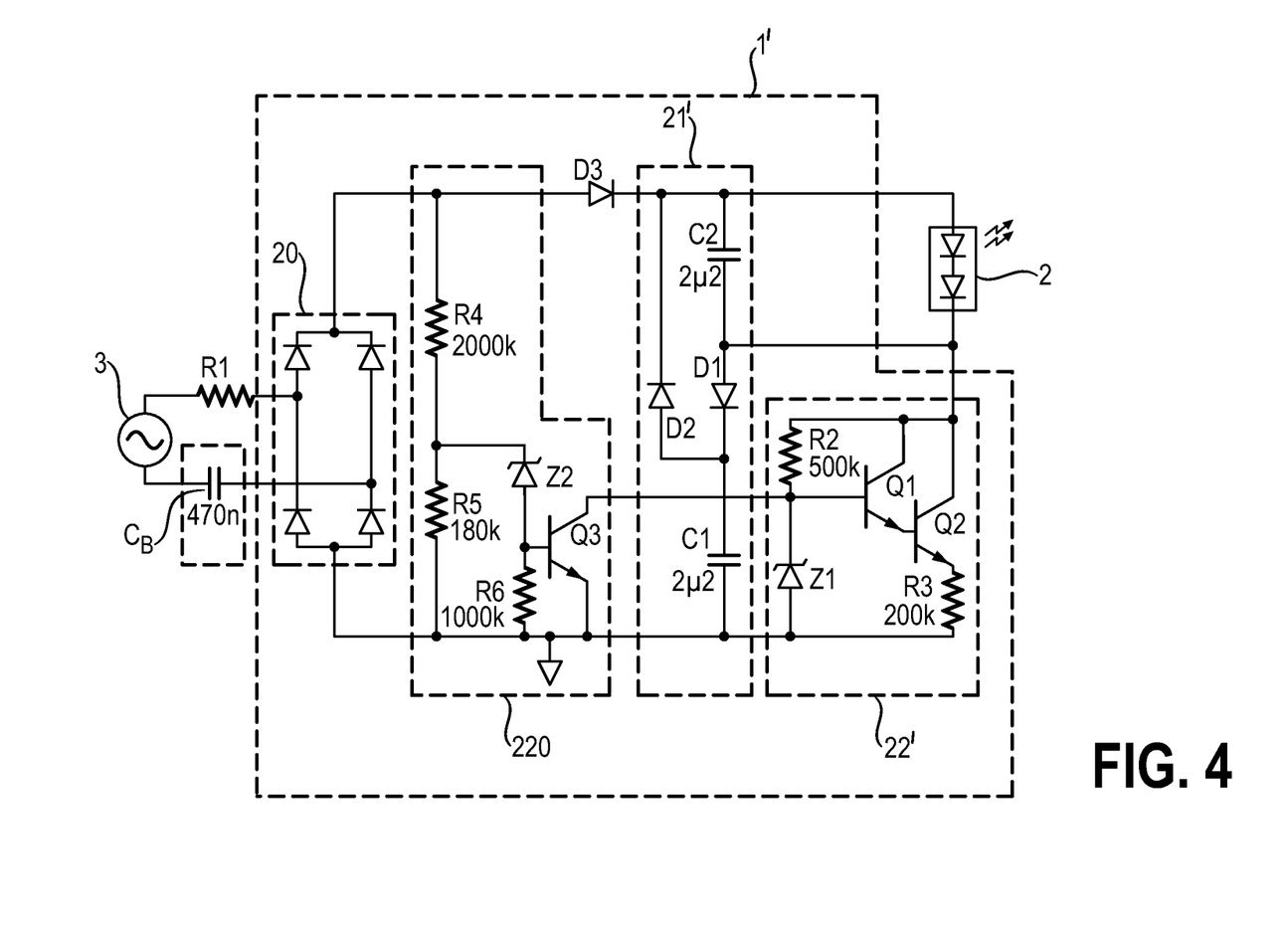
FIG. 4 shows a circuit diagram of an adaptive circuit according to a second embodiment of the invention.

FIG. 4 shows a realisation of the adaptive circuit 1' according to a further embodiment. Again, the adaptive circuit 1' comprises a diode bridge rectifier 20 that performs full-wave rectification on a mains input voltage from a mains supply 3. A charge-storage circuit 21' comprises a pair of series-connected capacitors C1, C2 and two diodes D1, D2. The load 2 is connected across the second capacitor C2. In this realisation, the active switch 22' comprises a Darlington pair Q1, Q2 whose base signal is delivered via the resistor R2, the base voltage being limited by a first Zener diode Z1. The voltage across the first Zener diode Z1 is in turn governed by a switch controller 220, which comprises a voltage divider R4, R5, a second Zener diode Z2, and a transistor Q3. In FIG. 4, the components R4, R5, Z2, R6, Q3, Z1 in conjunction with the resistor R2 depict a possible embodiment of the voltage source V2 described in FIGS. 2 and 3. A decoupling diode D3 is included to permit the input voltage to be measured accurately by the switch controller 220.

While the switch 22' and the switch controller 220 are shown to be separate parts of the overall circuit in this diagram, it will be clear to the skilled person that the switch 22 and the switch controller 220 operate in conjunction with one another and can therefore be regarded as a single 'entity' or single active switch.

Again, component values are indicated in the diagram. The first and second Zener diodes Z1, Z2 can have a Zener voltage of 10V, the transistors Q1, Q2 are preferably rated for voltages of more than half the peak input voltage, while the transistor Q3 can be a low-voltage transistor type, e.g. BC337. In this embodiment, whenever the voltage at the output of the voltage divider R4, R5 reaches the Zener voltage of the second Zener diode Z2, the transistor Q3 becomes conductive, in turn diverting the current delivered via resistor R2, thus shutting down base current into the Darlington pair Q1, Q2, such that the active switch 22' is effectively opened. In the case that the momentary value of the input voltage is too low to activate Q3, the transistor pair Q1, Q2 receives base current via R2 and allows a current flow according to the value pre-programmed by the Zener diode Z1, the emitter resistance R3 and the effective base-emitter voltage of the Darlington pair Q1, Q2. In the example given here, the allowed current will be approximately the difference between the Zener diode voltage and the base-emitter voltage of the Darlington pair, divided by the emitter resistance R3. Using the components shown, this gives a current of about (10 V−1.4 V)/300Ω=28.6 mA.

For this adaptive circuit 1', using the components indicated, the input power is 2.72 W, while the LED power is 2.12 W, so that the efficiency of the circuit equals 78%. The power factor of this adaptive circuit 1' was measured to be 0.61, which favourably exceeds the minimum of 0.5. The amount of optical flicker in the light emitted by the LED load 2 was analysed, and a flicker index of 0.14 was determined. Since most of the optical flicker for this circuit is at 200 Hz, it effectively cannot be perceived by the human eye, making the adaptive circuit 1' particularly suitable for use in a retrofit lamp application. An optional capacitive ballast $C_B$ is shown, which can be used to provide a further match between the AC input voltage and the LED load voltage and maintain a higher efficiency even for LED load voltages that are not matched to approximately half the AC input voltage. This in turn can improve the efficiency even more, while leaving the favourably high power factor nearly unchanged, so that an efficiency of 87% can be achieved with a power factor of 0.6. The circuit can be modified according to the requirements. For example, instead of using a bipolar Darlington transistor or a pair of transistors Q1, Q2 in Darlington configuration, a FET could be used.

Figure 5:
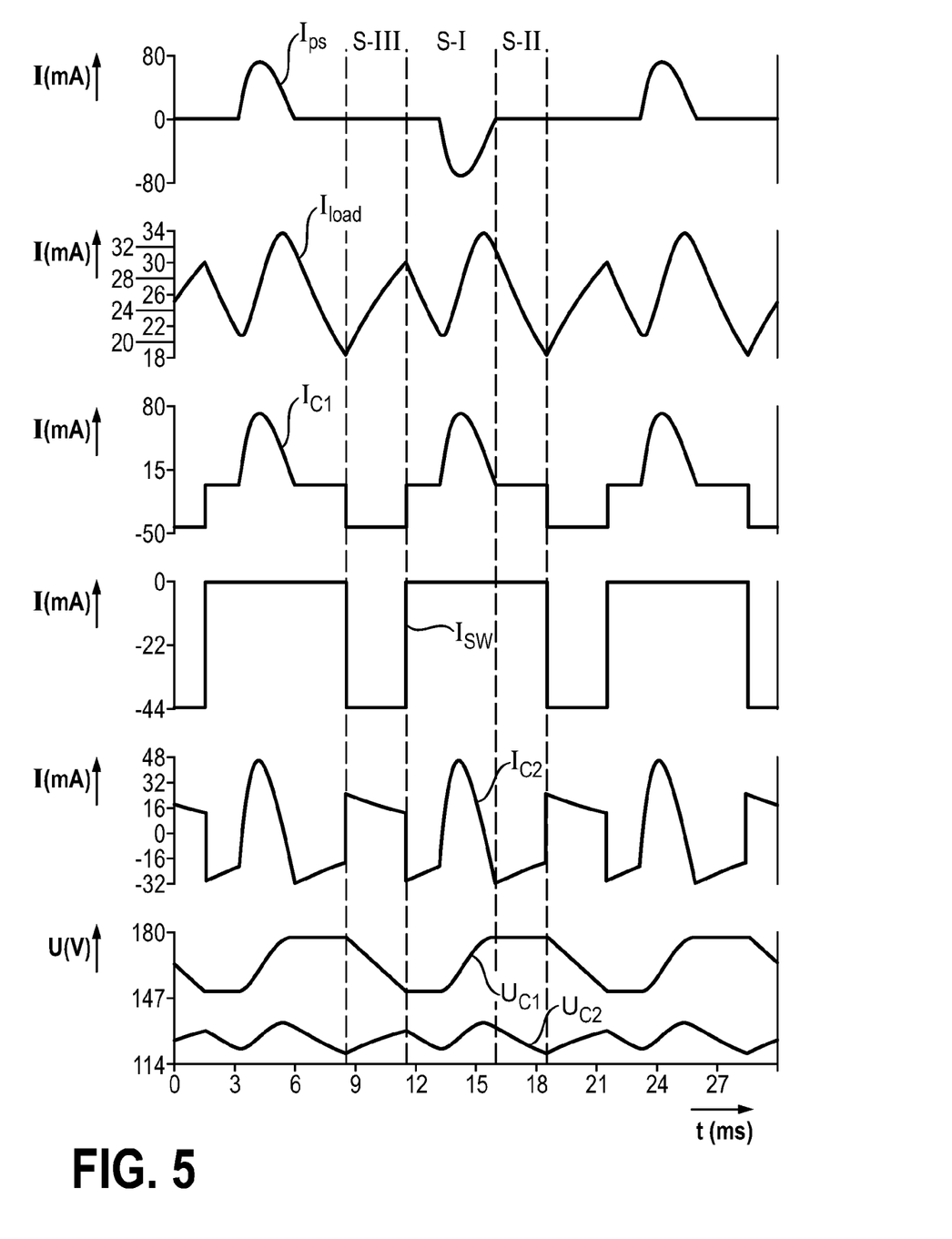
FIG. 5 shows graphs of current and voltage for the adaptive circuit of FIG. 4.

FIG. 5 shows a series of graphs for current through certain elements of the circuit of FIG. 4. Supply current $I_P$, is drawn from the AC source 3 as long as the capacitors C1, C2 of the charge-storage circuit 21' are charging. The load current $I_{load}$ through the load 2 is shown to fluctuate between approximately 20 mA and 34 mA. The first capacitor current $I_{C1}$ through the capacitor C1 increases rapidly to a peak during charging and then drops off to zero again when the capacitor C1 is fully charged. As long as the switch remains open, no current flows through the fully charged first capacitor C1. Then, when the active switch 22' is closed, there is a negative, discharging current in the first capacitor current $I_{C1}$, which level is controlled by the active switch. When the switch is opened, the first capacitor current $I_{C1}$ drops back to zero. The switch current $I_{sw}$, through the Darlington pair Q1, Q2 toggles between 0 A (active switch is open, corresponding to states S-I and S-II in FIGS. 3) and −44 mA (active switch is closed and conducting, corresponding to state S-III in FIG. 3).

The second capacitor current $I_{C2}$ drawn from the second capacitor C2 is a composition of the input current charging peak, the LED load drive current and the current delivered via the active switch. In this embodiment, the current delivered from the first capacitor C1 through the active switch 22' is higher than the actual current consumption of the LED load 2, hence part of the current flows as a charging current into the second capacitor C2. The second capacitor current $I_{C2}$ reaches a maximum in the region of 40 mA during the charging state of the charge-storage circuit 21', whereas the peak charging current in the first capacitor C1 is approximately 70 mA. The difference between these currents is the current $I_{load}$ supplied to the LED load 2. Since the load 2 is placed essentially in parallel with the second capacitor C2, the load 2 is continuously driven.

At the bottom of the diagram, voltages $U_{C1}$, $U_{C2}$ are shown for the first and second capacitor C1, C2, respectively. The first capacitor voltage $U_{C1}$ can reach about half of the peak input voltage, while the voltage $U_{C2}$ across the second capacitor C2 (and therefore also the voltage across the load 2) oscillates about 120 V. This voltage level depends of course on the forward voltage of the lower-voltage LED load 2.

Figure 6:
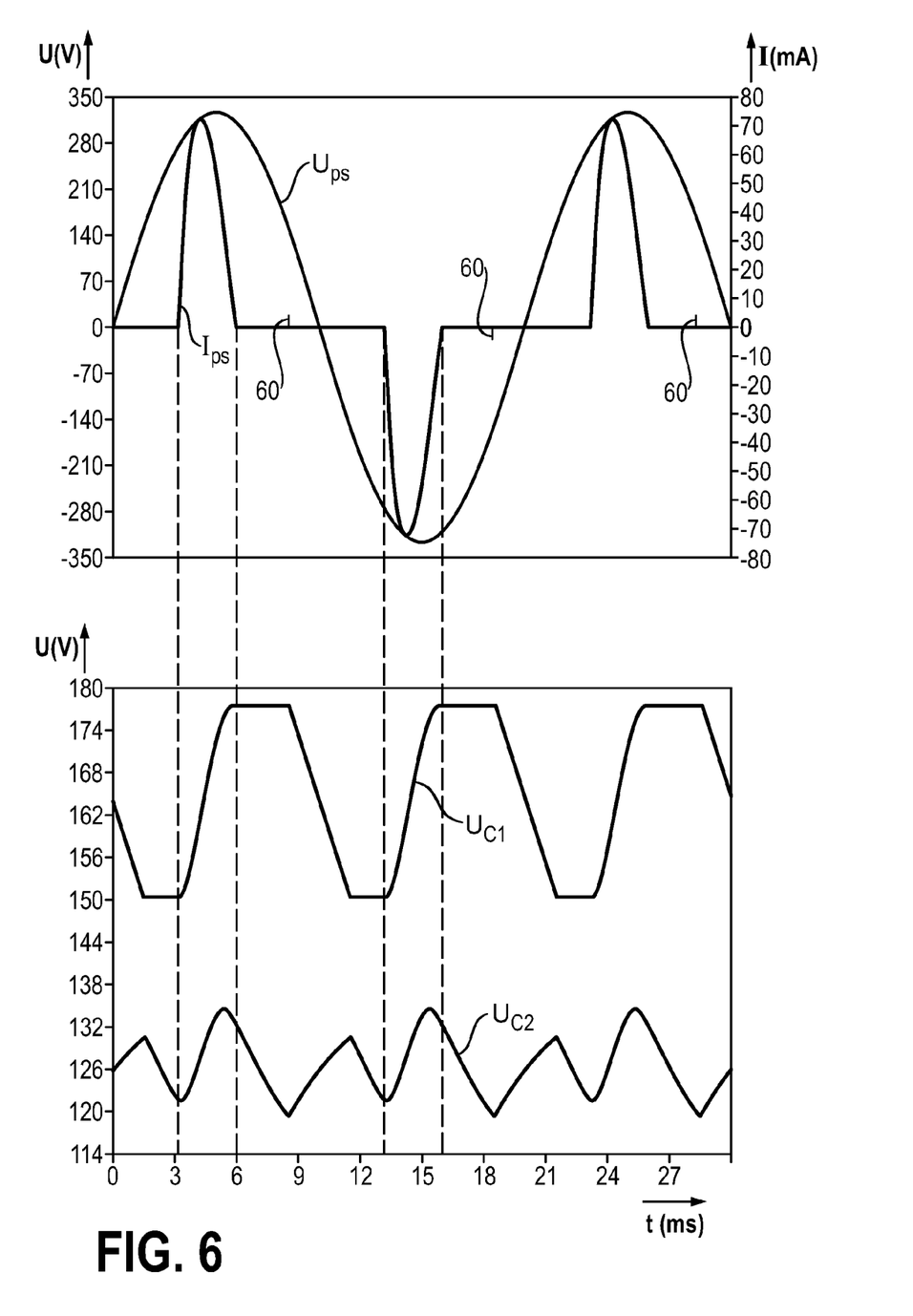
FIG. 6 shows a further set of graphs of current and voltage for the adaptive circuit of FIG. 4.

FIG. 6 shows another set of graphs for the mains voltage $U_{PS}$, mains current $I_{PS}$, first capacitor voltage $U_{C1}$ and load voltage $U_{C2}$. This graph more clearly shows the relationship between the mains voltage $U_{PS}$ and the load voltage $U_{C2}$, and that the load voltage oscillates as the load 2 is fed by the second capacitor C2 while charging and then as the load 2 draws from the charged second capacitor C2 (while the active switch is open), and then as the load is fed by both capacitors C1, C2 (while the active 22' switch is closed). Most importantly, FIG. 6 shows that the actuation of the active switch does not result in artefacts on the mains input side of the adaptive circuit. The active switch is closed in a period where the mains voltage is so low that hardly any current flow is possible from the mains into the adaptive circuit. Therefore, only a very small current spike 60 appears on the mains side at the instant when the switch is closed. With appropriate adjustments, even this small spike 60 can be suppressed. For example, the activation period of the active switch could be shortened to suppress the spike 60. Also, the activation period of the active switch could be shifted towards an earlier instant, which would also result in the small spike 60 being suppressed.

In an alternative embodiment, as already indicated above, the activation period of the active switch could be prolonged or moved towards an earlier or a later part of the mains period to intentionally draw additional current from the mains and thus actively influence the apparent capacitive or inductive behavior of the adaptive circuit as seen from the input terminal.

Figure 7:
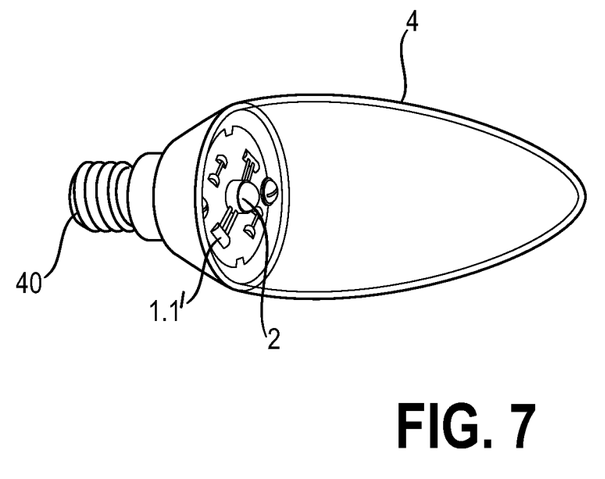
FIG. 7 shows a schematic rendering of a retrofit LED lamp according to an embodiment of the invention.

FIG. 7 shows a retrofit LED lamp 4 according to the invention, realised as a 'candle' with a suitable connector 40 for screwing the lamp into a corresponding socket to replace an incandescent lamp of the same type. In place of a filament, this retrofit lamp comprises a DCLED or ACLED package 2, rated for a lower-voltage supply such as a 110 V mains, and an adaptive circuit 1, 1' of the type described above for adapting the higher-voltage mains supply signal to a lower voltage suitable for driving the LED package 2.

Although the present invention has been disclosed in the form of preferred embodiments and variations thereon, it will be understood that numerous additional modifications and variations could be made thereto without departing from the scope of the invention. The trade-off between losses in the active switch, high-frequency switching artefacts and low-frequency harmonics of the input waveform to the load can be adjusted as desired. For example, by controlling the active switch with a continuous drive signal that is variable in amplitude, high frequency artefacts can be avoided. Other fine-tuning steps which will be known to the skilled person can be taken to improve the circuit behavior according to the application for which the adaptive circuit is intended.

For the sake of clarity, it is to be understood that the use of "a" or "an" throughout this application does not exclude a plurality, and "comprising" does not exclude other steps or elements. A "unit" can comprise a plurality of units unless otherwise stated.

The invention claimed is:

1. An adaptive circuit for driving a lower-voltage DC load from a rectified higher-voltage AC supply, which adaptive circuit comprises
    a charge-storage circuit, which charge storage circuit comprises a first capacitor (C1) and a second capacitor (C2) connected essentially in series, wherein the second capacitor (C2) is connected essentially in parallel with the load; and
    an active switch comprising a controlled current source for controlling a load current ($I_{load}$) through the load such that, in a closed switch state, load current ($I_{load}$) is drawn at least from the first capacitor of the charge-storage circuit, and, during an open switch state, load current ($I_{load}$) is drawn essentially from the second capacitor (C2).

2. An adaptive circuit according to claim 1, comprising a single active switch.

3. An adaptive circuit according to claim 1, wherein the load is essentially continuously driven from the second capacitor (C2) and wherein the active switch is periodically actuated to augment the load current with current supplied by the first capacitor (C1).

4. An adaptive circuit according to claim 1, wherein the active switch comprises a transistor (Q1, Q2, Q3) and a voltage source (R4, R5, Z2, R6, Q3, Z1).

5. An adaptive circuit according to claim 1, wherein the active switch comprises a switch controller realised to close the active switch at a specific input voltage and/or at a specific time instant.

6. An adaptive circuit according to claim 1, comprising a diode bridge rectifier for rectifying an AC supply signal ($U_{PS}$).

7. An adaptive circuit according to claim 1, realised to adapt an input voltage ($U_{PS}$) from a 230 V mains supply to an output voltage ($U_{C2}$) in the range of 50-160 V.

8. An LED retrofit lamp comprising
    a connecting means for connecting the lamp to a higher-voltage mains supply signal ($U_{PS}$);
    an LED device rated for a lower-voltage supply; and
    an adaptive circuit according to claim 1 for adapting the higher-voltage mains supply signal ($U_{PS}$) to a lower-voltage signal ($U_{C2}$) for driving the lower-voltage LED device.

9. An LED retrofit lamp according to claim 8, wherein the low-power LED device comprises a 2 W LED device and the adaptive circuit is realised to drive the LED device from a 230 V mains supply.

10. A method of driving a lower-voltage DC load from a rectified higher-voltage AC supply, which method comprises the steps of
    storing charge in a charge-storage circuit, which charge storage circuit comprises a first capacitor (C1) and a second capacitor (C2) connected essentially in series, wherein the second capacitor (C2) is connected essentially in parallel with the load; and
    actuating an active switch, which active switch is realised as a controlled current source, to control a load current ($I_{load}$) through the load such that, in a closed switch state, load current ($I_{load}$) is drawn at least from the first capacitor (C1) of the charge-storage circuit, and, during an open switch state, load current ($I_{load}$) is drawn essentially from the second capacitor (C2).

11. A method according to claim 10, wherein the active switch is actuated synchronously with the voltage ($U_{PS}$) of the AC mains supply.

12. A method according to claim 10, wherein the instant of actuation of the active switch is chosen according to a desired apparent reactance.

13. A method according to claim 10, wherein the total amount of power delivered to the load is determined by a control signal of the active switch.

14. A method according to claim 10, wherein the active switch is switched from open to closed to initiate a discharging state of the charge-storage circuit.

15. A method according to claim 10, wherein the active switch is actuated by a continuous drive signal.

\* \* \* \* \*